United States Patent Office 3,817,791
Patented June 18, 1974

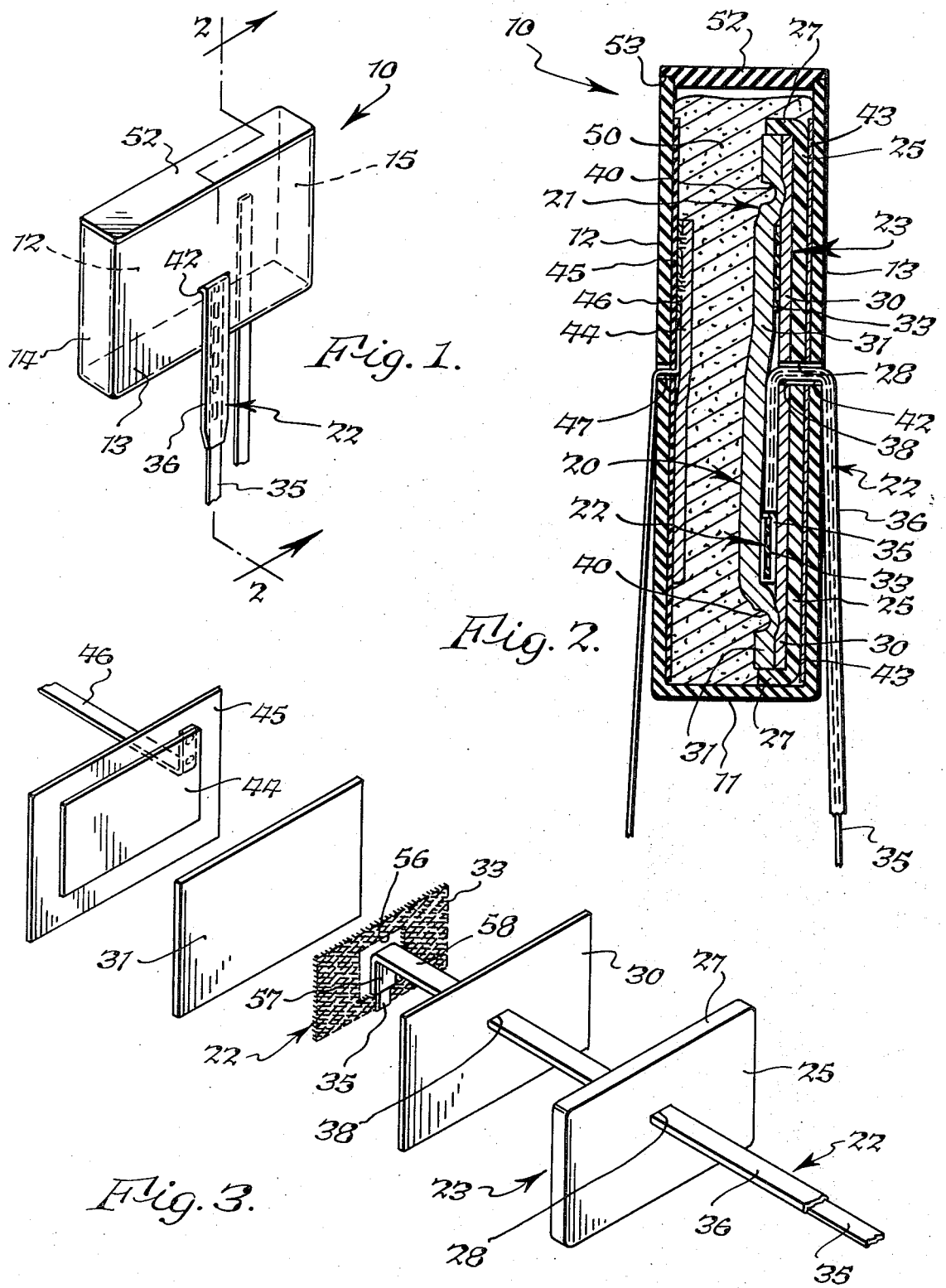

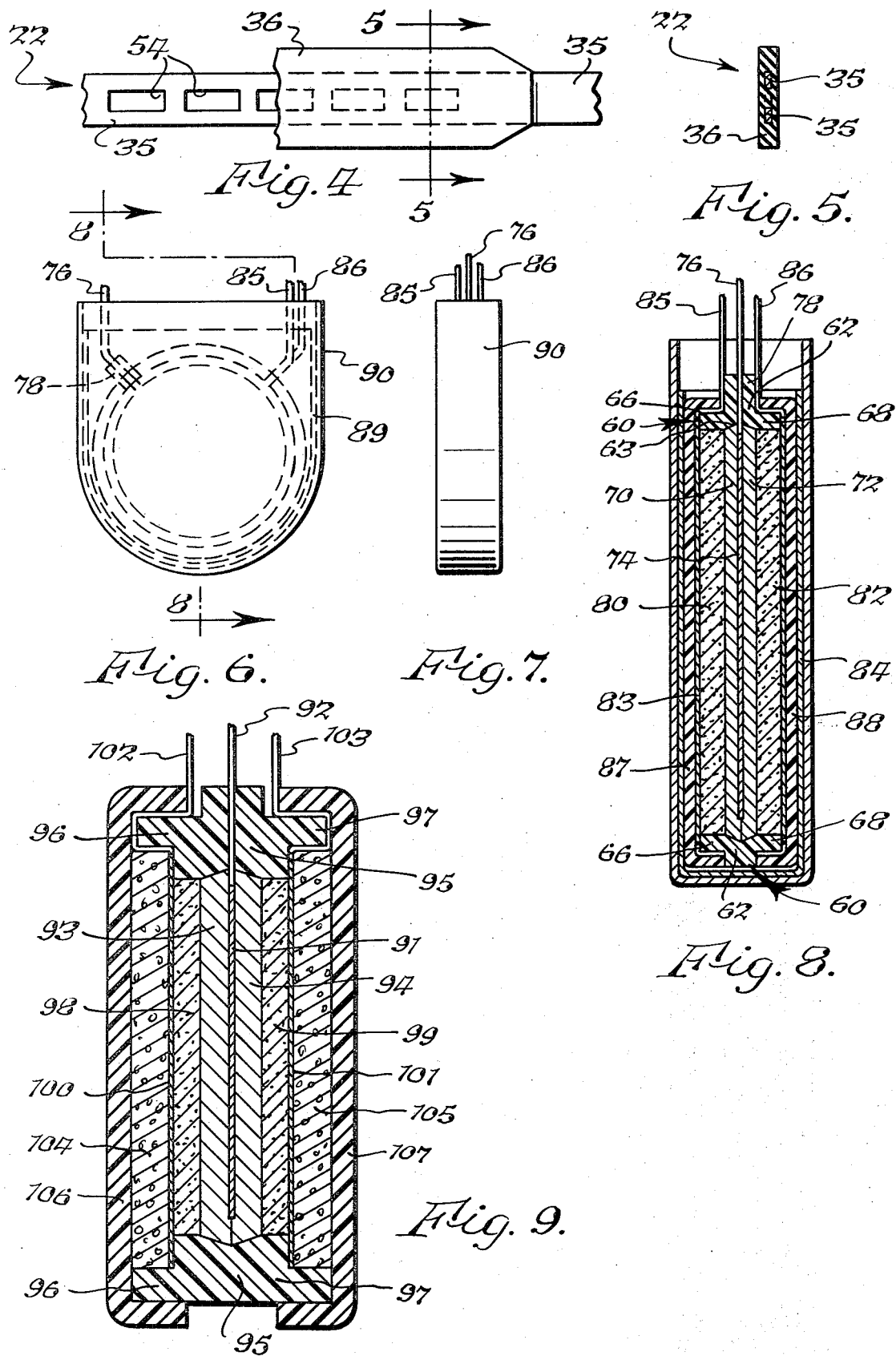

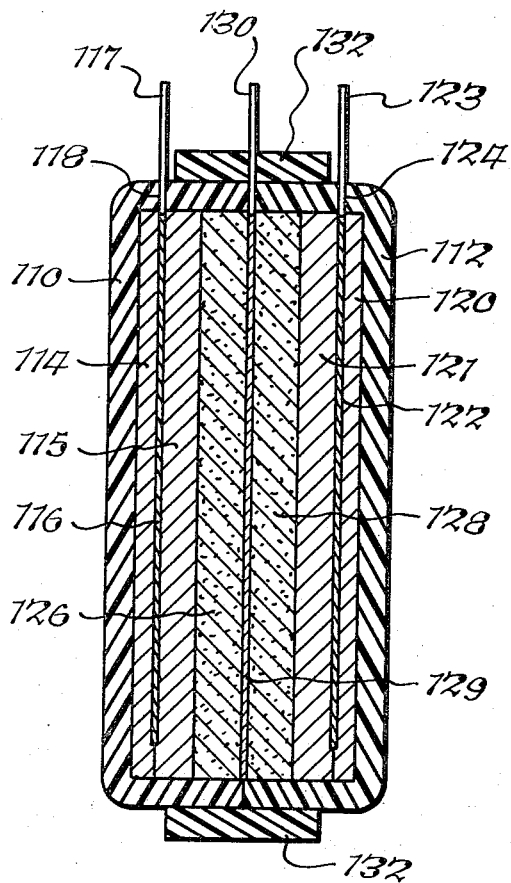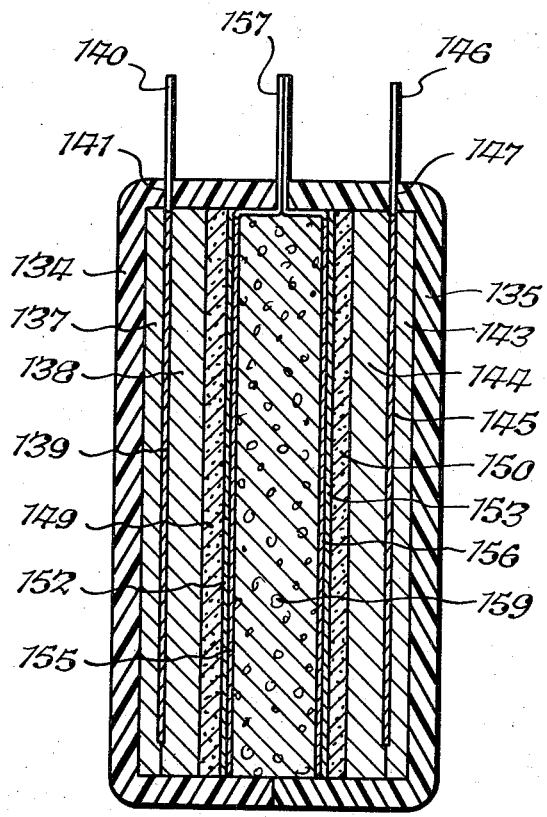

3,817,791
LITHIUM IODINE BATTERY
Wilson Greatbatch, Clarence, and Ralph T. Mead, Kenmore, N.Y., assignors to Wilson Greatbatch Ltd., Clarence, N.Y.
Filed Jan. 31, 1973, Ser. No. 328,313
Int. Cl. H01m 43/00
U.S. Cl. 136—83 R      24 Claims

ABSTRACT OF THE DISCLOSURE

A lithium-iodine cell comprising a casing, a cathode of iodine-containing material within the casing, a cathode current collector positioned in the casing in contact with the cathode material and connected to an electrical conductor which extends through the casing, and an anode assembly comprising a lithium member having a surface exposed to the cathode material, an anode current collector contacting the lithium member, and means holding the lithium member and anode current collector in the casing in a manner sealing the connection of the current collector to the lithium member from exposure to the iodine-containing material. An insulated electrical conductor connected to the anode current collector extends through the holding means and the casing. The holding means is of a material which does not exhibit electronic conduction when exposed to iodine. The anode assembly preferably comprises a pair of lithium members bonded together and against the current collector in a manner sealing the same and a holding means of frame member surrounding the peripheral edges of the lithium members in a manner sealing the edges.

BACKGROUND OF THE INVENTION

This invention relates to the conversion of chemical energy to electrical energy, and more particularly to a new and improved construction for lithium-iodine cells.

One area of use of the present invention is in providing electrical power safely to inaccessible devices in the human environment, for example to an implanted cardiac pacemaker, although the principles of the present invention can be variously applied. Various batteries for implantable cardiac pacemakers have been proposed, but heretofore all have certain limitations. Recently, a lithium-iodine cell has been proposed which advantageously has an open circuit voltage about twice that of the mercury cell, does not generate gas during operation, and has a non-corrosive electrolyte.

One of the principal problems in designing a lithium-iodine cell is to prevent iodine leakage. Iodine is present in vapor form and in a complex material which is viscous or flowable. If the iodine migrates or flows within the cell and makes contact with the anode current collector, an internal electrical short circuit is formed in the cell.

SUMMARY OF THE INVENTION

It is, therefore, an object of this invention to provide a new and improved construction for a lithium-iodine cell.

It is a more particular object of this invention to provide such a cell construction which constrains iodine migration thereby avoiding an internal electrical short circuit in the cell.

It is a further object of this invention to provide such a cell construction which is relatively simple and is convenient and economical to manufacture.

The present invention provides a lithium-iodine cell wherein iodine-containing material comprises the cathode and a member of lithium contacted by a current collector comprises the anode, the anode being held within the cell by a holding means which protects the anode current collector from being contacted by the cathode material. The holding means is of a material which does not exhibit electronic conduction when exposed to iodine. The anode assembly preferably comprises a current collector sealed between two adjacent lithium members and a holding means continuously surrounding the peripheral edges of the lithium members in a manner sealing the same.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a perspective view of a cell according to the present invention;

FIG. 2 is a sectional view taken about on line 2—2 in FIG. 1;

FIG. 3 is a developed view illustrating the construction of the cell of FIG. 1;

FIG. 4 is a fragmentary elevational view of a component of the cell illustrated in FIGS. 1–3;

FIG. 5 is a sectional view taken about on line 5—5 in FIG. 4;

FIG. 6 is a side elevational view of a cell according to another embodiment of the present invention;

FIG. 7 is an end elevational view of the cell of FIG. 6;

FIG. 8 is a sectional view taken about on line 8—8 in FIG. 6;

FIG. 9 is a sectional view of a cell according to another embodiment of the present invention;

FIG. 10 is a sectional view of a cell according to another embodiment of the present invention; and FIG. 11 is a sectional view of a cell according to another embodiment of the present invention.

DETAILED DESCRIPTION OF THE ILLUSTRATED EMBODIMENT

A lithium-iodine cell according to the present invention comprises a casing 10 of a plastic material which is non-reactive with iodine, preferably an epoxy material which has been suitably cured. Casing 10 as shown in FIG. 1 preferably is molded or otherwise formed to be hollow rectangular in shape and of an integral construction including a bottom 11, spaced-apart side walls 12, 13 extending from bottom 11 and spaced-apart end walls 14, 15 also extending from bottom 11 and joining corresponding one of the side walls 12, 13. Casing 10 has an open top but this is sealed closed after the cell has been assembled as will be described in detail presently.

The cell of the present invention as shown in FIG. 2 further comprises anode means 20 positioned within casing 10 and comprising a lithium member 21 having an exposed surface portion and another surface portion, electrical conductor means 22 connected to the other surface portion of member 21 and extending through casing 10 for providing an externally available electrical connection to anode means 20, and means 23 for holding lithium member 21 within casing 20. In accordance with this invention, holding means 23 is of a material which does not exhibit electronic conduction when exposed to iodine, and holding means 23 is shaped to receive lithium member 21 in a manner exposing the one surface portion to the iodine-containing cathode material in cell 10 and sealing the connection of conductor means 22 to the other surface portion of lithium member 21 from exposure to the iodine-containing material.

In a preferred form of anode means 20, holding means 23 is formed to have a subtantially planar face portion 25 and a continuous peripheral rim portion 27 extending from face portion 25. Holding means 23 is of a fluoropolymer material which does not exhibit electronic conduction when exposed to iodine. A preferred material is Durasan, when holding means 23 is formed by hot drawing of sheet material, or Halar when holding means 23 is formed by injection molding. Both Durasan and Halar are trademarks of the Allied Chemical Co. Alternative materials are Tefzel which is a trade name of the Dupont Co., a polyvinylidene resin identified by the registered trademark Kynar of the Pennwalt Co., and suitable fluorinated hydrocarbon materials.

As shown in FIGS. 2 and 3, face portion 25 of holding means 23 is provided with a small slot or aperture 28 of a size permitting electrical conducting means 22 to extend therethrough as will be described in detail presently. Lithium member 21 is fitted snugly within rim portion 27 and in preferred form lithium member 21 comprises a pair of lithium plates or foil members 30 and 31. Plates 30, 31 are fitted face-to-face within rim portion 27 of holding means 23, and conductor means 22 comprises an anode current collector member 33 positioned or sandwiched between plates 30, 31 and in contact therewith. Collector 33 can comprise expanded zirconium or nickel #12 mesh having a thickness of about 5 mils. An insulated electrical lead 35 comprising a strip of zirconium or nickel encapsulated in a material 36 which is an electrical insulator and which does not exhibit electronic conduction when exposed to iodine, is connected at one end thereof to current collector 33 and extends through a slot or aperture 38 provided in lithium plate 30 adjacent face portion 25 and through aperture 28 of face portion 25. Holding means 23 thus serves as a frame or support for the sandwiched arrangement of lithium plates 30, 31 and current collector 33.

Anode means 20 is formed according to the method of the present invention in the following manner. The material of holding means 23, in addition to not exhibiting electronic conduction when exposed to iodine, also should have the characteristic of being pressure bondable to lithium. Lithium plate 30 is placed in holding means 23 so as to be fitted in rim 27 wherein the aperture 38 in plate 30 is in registry with aperture 28 of face portion 25. The lead portion of conductor means 22 is passed through the aligned apertures 28, 38 until current collector 33 is in contact with the exposed face of plate 30. Then plate 31 is placed in contact with current collector 33 and fitted within rim portion 27. The anode assembly then is pressed together with a suitable force, for example about 3000 pounds, causing the assembly to be bonded together. As a result, lithium plates 30, 31 are bonded together in a manner sealing current collector 33 between the plates 30, 31 and the peripheral juncture or edges of plates 30, 31 is sealed by rim 27 of holding means 23. A peripheral groove 40 is formed in the exposed face of lithium plate 31 by hand with a suitable tool or by machine, either after the pressing operation or during the operation in which case a suitable die would be required, with the result that the resulting groove enhances the lithium-lithium bond between plates 30, 31 because the deformation provided by groove 40 exposes new surfaces of the metal to each other.

Anode means 20 is positioned within casing 10 in the following manner. One of the side walls of casing 10, in the present instance wall 13, is provided with a slot or aperture 42 of a size permitting the lead portion of conductor means 22 to extend therethrough. Anode means 20 is moved into position within casing 10, and at the same time conductor means 22 is drawn through slot 42 until face portion 25 of holding means 23 is almost in contact with the inner surface of casing wall 13. A suitable cement 43 is applied to the outer surface of face portion 25 and to the corresponding portion of the inner surface of wall 13, whereupon conductor means 22 is drawn further through slot 42 and the two surfaces are placed in contact with each other. When the cement hardens, anode means 20 is then attached to the inner surface of wall 13. It is important that the cement utilized be of the fast setting type and also prevent migration of iodine therethrough into the anode current collector assembly. One preferred form of cement which satisfies these requirements is a cyanoacrylate cement commercially available from Techni-Tool, Inc. under the designation Permabond 101. It is important that the cement be relatively fast-setting to prevent formation of undesired compounds in the cell, such as nitrides.

The cell according to the present invention further comprises electrical conductor means connected to the cathode of the cell and extending through casing 10. In preferred form a cathode current collector 44 in the form of a very thin sheet or strip of zirconium or nickel foil is positioned within casing 10 and spaced from the inner surface of wall 12 by a spacer member 45 of Teflon or similar material. A lead 46 connected to collector 44 extends through a slot in spacer member 45 and a slot 47 in casing wall 12 for providing an externally available electrical connection to the cathode current collector 44. Collector 44 is positioned adjacent the inner surface of casing wall 12, and the purpose of spacer member 45 will be described in detail presently.

The cell of the present invention is completed by the provision of cathode means comprising iodine-containing material within casing 10. Cathode means 50 preferably comprises a charge transfer complex of an organic material and iodine. The organic material should be an electron donor and can be any organic compound having a double bond or an amine group. An electron donor is necessary to give the iodine sufficient conductivity for proper cell operation. A preferred organic material is 2-vinyl pyridine polymer. Cathode material or depolarizer 50 is prepared by heating the organic material, i.e. 2-vinyl pyridine, to a temperature greater than the crystallization temperature of iodine and then adding iodine to the heated material. The amount of iodine added should be greater than about 50 percent by weight of the resulting mixture so that enough iodine is available in cathode material 50 to provide sufficient conductivity for proper cell operation. The amount of iodine added, however, should not be so excessive as to interfere with surface contact between lithium plate 31 and the cathode material complex 50 by recrystallization.

The resulting mixture is a viscous, flowable substance which is introduced to casing 10 in the following manner. Casing 10 is held either by hand or in a fixture in an upright position whereupon material 50 is poured into casing 10 through the open top thereof. Material 50 fills the interior of casing 10 in an amount sufficient to contact the exposed surface portion of lithium plate 31 as well as the cathode current collector 44. The casing 10 is sealed at the top such as by means of a lid member 52 of epoxy or similar material which is placed on and cemented to the top peripheral edge of casing 10. Attachment of lid 52 to casing 10 can be facilitated by a peripheral recess 53 defining a shoulder around the edge of lid 52. The fast-setting nature of the cement used to attach holding means 23 to casing 10 permits cathode material 50 to be introduced relatively soon thereafter.

The lithium-iodine cell according to the present invention operates in the following manner. As soon as iodine-containing cathode material or depolarizer 50 is placed in casing 10 in contact with the exposed portion of lithium plate 31, a lithium iodide electrolyte begins to form at the interface and an electrical potential difference exists between the anode and cathode electrical leads. It is important that the iodine-containing material 50 is not allowed to come in contact directly with any portion of the electrical conducting means 22 connected to the lithium member 21 of the anode 20 such as the anode current collector 33. Otherwise, this will cause an electronic conduction between the cathode material 50 and the anode current collector 33 of the electrical conductor means 22 creating an electrical short circuit condition in the cell. In particular, any migration of the iodine-containing complex of material 50 directly to anode current collector 33 or directly to anode lead 35, instead of first reacting with lithium member 21 of the anode, will result in the condition of electronic conduction thereby creating a short circuit in the cell. On the other hand, when the iodine-containing material 50 contacts only the lithium anode member 21, this gives rise first to a condition of ionic conduction and results in proper cell operation.

The cell construction according to the present invention advantageously prevents an electrical short circuit caused by migration or flow of material 50. In particular, the connection of the electrical conductor means 22 and anode means 20 to lithium member 21 is sealed by holding means 23 which is of a material, preferably Durasan, which does not exhibit electronic conduction when exposed to iodine. The preferred arrangement wherein current collector 33 is pressed between lithium plates 30, 31 enhances the protective seal provided by holding means 23 for current collector 33 against iodine migration. Furthermore, both lithium plates 30, 31 can be used for battery action. Thus the anode current collector 33 is effectively isolated from the iodine-containing complex of cathode material 50. If desired, the junction between the inner surface of the rim portion 27 of holding means 23 and the periphery of lithium plates 30, 31 can be sealed further by a suitable cement which is non-reactive with iodine such as the previously-mentioned cyanoacrylate cement designated Permabond 101. In addition, the cement 43 which secures the face portion 25 of holding means 23 to casing 10, being of a material which is non-reactive with iodine, seals against iodine migration along the electrical conductor means 22. Should any leakage occur, however, the insulated portion 36 of conductor means 22 is of a material which does not exhibit electronic conduction when exposed to iodine and is of sufficient length to provide a relatively long path to minimize or substantially eliminate any possibility that iodine-containing material 50 could migrate through and along the conductor means 22 to current collector 33. As shown in FIG. 3, current collector 33 has a central opening 56 thereby requiring that conductor means 22, i.e. lead 35 and insulated portion 36, be bent at substantially a right angle to permit the electrical connection between conductor 22 and collector 33 to be made near the edge of collector 33 and adjacent the edge of opening 56. In particular, conductor means 22 has a first portion 57 adjacent the end thereof positioned in opening 56 and disposed substantially in the plane of collector 33 and an adjacent, second portion 58 extending from collector 33 at an angle thereto. This, in turn, contributes to the relatively long path because any iodine-containing material which could flow along the insulated portion 36 of conductor means 22 and through the aperture in lithium plate 30 still would have to flow further along the bent portion before reaching collector 33. In other words, should any material flow through aperture 38 in lithium plate 30, it still would not be in immediate contact with current collector 33 but would have further to travel before reaching collector 33.

Spacer member 45 acts like a spring to maintain cathode current collector 44 in contact with cathode material 50 during the life of the cell. If for any reason the cathode material 50 should contract or experience any other physical distortion tending to separate it from cathode current collector 44, member 45 compensates for this by urging collector element 44 back into contact with the depolarizer material 50. In addition, collector 44 has more chemical attraction or affinity for the complex of material 50 than for the Teflon material of spacer member 45, and if there is any shrinkage in material 50 during cell discharge, this shrinkage will be accommodated by separation from material 45 rather than collector 44. While all of the cell components which are of fluoropolymer material are treated with a sodium naphthanate solution for bondability where subsequent potting or cementing operations require adhesion to the fluoropolymer material, spacer member 45 is left untreated to prevent or minimize adhesion.

FIGS. 4 and 5 illustrate in further detail the construction of electrical conductor means 22 comprising lead 35 embedded in insulating material 36. Lead 35 is stamped or otherwise formed to have slots or apertures 54 spaced along the length thereof to facilitate the adherance of insulating material 36. A preferred method of forming conductor means 22 includes placing a strip of Durasan material in a mold, laying lead 35 on top thereof, placing another strip of Durasan material on top of lead 35 and then applying sufficient pressure and heat to form the completed structure with lead 35 embedded or encapsulated in the Durasan insulating material 36.

In addition to not exhibiting electronic conduction when exposed to iodine and in addition to being pressure bondable to lithium, the fluoropolymer material such as Durasan from which holding means 23 and insulator 36 are formed does not release or form any harmful or undesirable chemical byproducts during the operation of the cell. This is of particular importance and advantage when the cell of the present invention is used to supply electrical energy to an implanted artificial cardiac pacemaker.

FIGS. 6-8 illustrate a cell according to another embodiment of the present invention constructed to include a single anode and a double cathode within the cell. An anode holding means 60 shown in FIG. 8 is generally annular in shape and formed of a fluoropolymer material which does not exhibit electronic condition when exposed to iodine, for example Durasan. Holding means 60 includes a central portion 62 provided with an annular, internal recess or notch 63 for a purpose to be described and outwardly directed ring-shaped portions 66 and 68 extending from opposite surfaces of body portion 62. Body portion 62 defines an internal or interior region for holding a lithium anode member comprising a pair of lithium discs 70, 72 pressure bonded together and against an anode current collector element 74 in a manner similar to the arrangement of lithium plates 30, 31 and anode current collector 33 of the embodiment of FIGS. 1-5. Lithium discs 70, 72 with current collector 74 sandwiched therebetween are pressure bonded within holding means 60 whereby the lithium is forced into the annular recess 63 thereby enhancing the seal of anode current collector 74 between lithium members 70, 72. An electrical lead 76 provided with insulation of a material such as Durasan which does not exhibit electronic conduction when exposed to iodine, extends from collector 74 through an aperture provided in a boss-like formation 78 on holding means 60.

The cell according to this embodiment of the present invention further comprises a pair of cathode means 80 and 82 placed within ring members 66 and 68, respectively, thereby providing a double cathode cell construction. Each cathode means 80, 82 comprises iodine-containing material in the form of a charge transfer complex of an organic material and iodine such as 2-vinyl pyridine polymer and iodine similar to cathode material 50 of the embodiment of FIGS. 1-5. After the cathode material or depolarizer 80, 82 is added, a pair of cathode current collector members 83, 84 are positioned on corresponding exposed surfaces of cathode material 80, 82 which current collector members are formed to include leads 85, 86. The cell is closed by means of a pair of closure or cap members 87, 88 which are snap-fitted over ring portions 66 and 68, respectively. Closure members 87, 88 are sealed in place with epoxy material or a suitable cement such as Permabond 101. The completed cell assembly then is placed in a liner member 89 of Teflon or other fluoropolymer material or suitable non-reactive material such as epoxy or polyester material as shown in FIG. 6 and held in position by epoxy material. Then liner 89 is placed within a metal casing 90 which can be hermetically sealed in a known manner. Lead 76 is provided over its entire length with insulation of a material such as Durasan which does not exhibit electronic conduction when exposed to iodine in a manner similar to lead 35 in the embodiment of FIG. 2. While the cell is circular and liner 89 and casing 90 include semi-circular portions, the cell can be formed to have other shapes such as square or rectangular. The completed cell has a single anode to which electrical connection is made through lead 76 and two cathodes to which electrical connection is made through leads 85 and 86.

FIG. 9 illustrates a cell similar in construction to the cell of FIGS. 6–8 and including an anode current collector 91 sandwiched between a pair of lithium discs 93, 94 fitted within an anode holding means 95 of the same material and of substantially the same shape as holding means 60. The assembly is pressure bonded together. Holding means 95 is shaped to have outwardly directed generally ring-shaped portions 96, 97 each of which is stepped on the inner surface thereof to define adjacent annular regions of different diameters. The innermost annular regions, i.e. those adjacent lithium discs 93, 94 are filled with cathode material or depolarizer 98, 99 comprising a mixture of 2-vinyl pyridine polymer and iodine similar to the material of cathode means 80, 82 in the cell of FIG. 8. A pair of cathode current collectors 100, 101 are positioned on corresponding exposed surfaces of cathode means 98, 99 which current collectors are formed to include externally exposed leads 102, 103. Anode current collector 91 has an external lead 92. Then the outer annular regions of holding means are fitted with iodine pellets 104, 105 for providing an additional supply or reservoir of iodine, the pellets preferably containing some graphite or carbon black particles. Lead 92 is provided with insulation in a manner, identical to that of lead 76 in the embodiment of FIGS. 6–8. The cell is closed by means of a pair of closure cap members 106, 107 in a manner similar to that of the cell of FIGS. 6–8 and likewise can be fitted in a liner and outer metal casing.

FIG. 10 illustrates a cell according to another embodiment of the present invention constructed to include a single cathode and two anodes. The cell includes a pair of identical anode holding means 110, 112 each formed to be generally cup-shaped and of a fluoropolymer material which does not exhibit electronic conduction when exposed to iodine such as Durasan or a suitable polyester material. Each holding means 110, 112 contains a lithium anode member in the form of a pair of lithium plates having sandwiched therebetween an anode current collector. For example, holding means 110 contains lithium plates 114, 115 having sandwiched therebetween anode current collector 116 which is extended by a strip or lead portion 117 which projects through an aperture 118 provided in holding means 110. The assembly is formed by pressure bonding plates 114 and 115 together against collector 116 and within holding means 110 in a manner similar to that of the other embodiments. Likewise, holding means 112 contains a pair of lithium plates 120, 121 having sandwiched therebetween a current collector 122 having a lead 123 which extends through an aperture 124 provided in the wall of holding means 122. In each holding means 110, 112 the lithium plates occupy approximately half the interior volume thereof, and cathode means 126, 128 comprising iodine-containing material in the form of a charge transfer complex of an organic material and iodine such as 2-vinyl pyridine polymer and iodine is added to fill the remaining volume. The two half portions then are brought together against a single cathode current collector 129 having an external lead 130 and sealed together by a ring member 132 which embraces the two halves. The assembly can be placed in a liner and an outer metal casing. The completed cell has a single cathode to which electrical connection is made through lead 130 and two anodes to which electrical connection is made through leads 117 and 123. Leads 117 and 123 are insulated in a manner identical to that of lead 76 in the embodiment of FIGS. 6–8.

FIG. 11 illustrates a cell similar in construction to the cell of FIG. 10 and including a pair of identical cup-shaped anode holding means 134, 135 formed of a fluoropolymer material which does not exhibit electronic conduction when exposed to iodine such as Durasan or a suitable polyester material. Holding means 134 contains a lithium anode member in the form of a pair of lithium plates 137, 138 having sandwiched therebetween anode current collector 139 which is extended by a strip or lead portion 140 which projects through an aperture 141 provided in holding means 134. The assembly is formed by pressure bonding plates 137, 138 together against collector 139 and within holding means 134 in a manner similar to that of the other embodiments. Holding means 135 likewise contains a pair of lithium plates 143, 144 having sandwiched therebetween a current collector 145 having a lead 146 which extends through an aperture 147 provided in the wall of holding means 135. Holding means 134, 135 also contain regions 149 and 150, respectively, of cathode material or depolarizer comprising a mixture of 2-vinyl pyridine polymer and iodine. Adjacent regions 149, 150 and in contact with the depolarizer material are located insulating or barrier layers 152 and 153 of fiberglass or Teflon material. A pair of cathode current collector members 155 and 156 are positioned against the barrier layers 152 and 153, respectively, and merge into a single external lead 157. An iodine pellet 159 is positioned between collector members 155, 156 in contact therewith for providing an additional supply or reservoir of iodine, and pellet 159 preferably contains some graphite or carbon black particles. The assembly can be sealed together in a manner similar to that of the cell of FIG. 10 and can be placed in a liner and an outer metal casing. Leads 140 and 146 are insulated in a manner identical to that of lead 76 in the embodiment of FIGS. 6–8. The completed cell has a single cathode to which electrical connection is made through lead 157 and two anodes to which electrical connection is made through leads 140 and 146.

It is therefore apparent that the present invention accomplishes its intended objects. While several embodiments of the present invention have been described in detail, this is for the purpose of illustration, not limitation.

We claim:
1. A lithium-iodine cell comprising:
   (a) a casing;
   (b) cathode means comprising iodine-containing material within said casing;
   (c) anode means positioned within said casing and comprising a member of lithium having one surface portion exposed to said iodine-containing material and another surface portion, electrical conductor means connected to said other surface portion and extending through said casing, and means for holding said lithium member within said casing, said holding means being of a material which does not exhibit electronic conduction when exposed to iodine and being shaped to receive said lithium member in a manner exposing said one surface portion to said iodine-containing material and sealing the connection of said conductor to said other surface portion from exposure to said iodine-containing material; and
   (d) electrical conductor means connected to said cathode means and extending through said casing.

2. A cell as defined in claim 1, wherein said holding means is of a fluoropolymer material.

3. A cell as defined in claim 1, wherein said holding means is of a material which is pressure bondable to lithium.

4. A cell as defined in claim 1, further including a second member of lithium bonded to said first-named lithium member in a manner sealing the connection of said conductor means to said first-named lithium member, said holding means sealing the peripheral juncture of said lithium members.

5. A cell as defined in claim 1, wherein said holding means has a substantially planar face portion and a substantially continuous peripheral rim portion extending from said face portion, said lithium member being fitted within said rim portion and said conductor means extending through said face portion of said holding means.

6. A cell as defined in claim 5, wherein said lithium member comprises a pair of plates fitted face-to-face within said rim portion of said holding means and wherein said conductor means comprises a current collector positioned between said plates in contact therewith and an insulated electrical lead extending through one of said lithium plates and through said face portion of said holding means.

7. A cell as defined in claim 6, wherein said holding means is of a material which is pressure bondable to lithium and wherein said plates, current collector and holding means are pressure bonded together.

8. A cell as defined in claim 6, wherein said anode current collector comprises a substantially planar member provided with an opening generally centrally thereof and wherein said insulated electrical lead is connected at one end thereof to said current collector adjacent an edge of said opening, said lead having a first portion adjacent said end positioned in said opening and disposed substantially in the plane of said current collector and a second portion adjacent said first portion and extending from said current collector at an angle thereto.

9. A cell as defined in claim 1, wherein said casing is generally rectangular in shape and wherein said anode holding means is attached to the inner surface of one wall of said casing, said cathode electrical conductor means is attached to the inner surface of another wall of said casing, and said iodine-containing material fills the interior of said casing in an amount sufficient to contact the exposed surface portion of said lithium member and said cathode electrical conductor means.

10. A cell as defined in claim 9, wherein said anode holding means is attached to said casing wall by means of cyanocrylate cement.

11. A cell as defined in claim 9, further including spacing means between said cathode conductor means and said other wall of said casing for maintaining said conductor means in contact with said iodine-containing material.

12. A cell as defined in claim 4, wherein said holding means has a cross sectional shape conforming with the peripheral shape of said lithium members thereby exposing two lithium surfaces, wherein said iodine-containing material is separated into two regions each contacting one of said exposed lithium surfaces, and wherein said cathode conductor means comprises two separate conductor means each contacting a corresponding region of said iodine-containing material.

13. A cell as defined in claim 12, further including an iodine pellet contacting each cathode conductor means on the surface thereof opposite the surface contacting said iodine-containing material.

14. A cell according to claim 1, wherein said cell includes a pair of anode means and a pair of corresponding anode conductor means, each anode means having an exposed lithium surface, and wherein said iodine-containing material contacts both of said exposed lithium surfaces.

15. A cell according to claim 14, wherein said iodine-containing material is separated by an iodine pellet into two regions each contacting one of said exposed lithium surfaces and wherein said cathode conductor means contacts each region of said iodine-containing material.

16. A cell according to claim 15, further including barrier material between each region of said iodine-containing material and said pellet.

17. A cell as defined in claim 4, further including a groove formed in one of said lithium members for exposing new surfaces of lithium on each of said members to each other to enhance the bond between said members.

18. A cell as defined in claim 6, wherein said plates, current collector and holding means are sealed together with cyanoacrylate cement.

19. In a lithium-iodine cell, an anode assembly comprising:
(a) an anode current collector;
(b) a pair of lithium members bonded together and against said current collector in a manner sealing said current collector between said members;
(c) a frame member continuously surrounding the peripheral edges of said lithium members in a manner sealing said edges; and
(d) electrical conductor means connected to said current collector and extending through said frame member.

20. An anode assembly as defined in claim 19, wherein said frame member is of a material which does not exhibit electronic conduction when exposed to iodine.

21. An anode assembly as defined in claim 20, wherein said frame member is of a fluoropolymer material.

22. An anode assembly as defined in claim 19, wherein said anode current collector is generally planar and each of said lithium members comprises a plate of a size such that the perimeter of said current collector lies within the perimeter of each of said plates.

23. An anode assembly as defined in claim 19, wherein said frame member has a cross sectional shape conforming with the peripheral shape of said lithium members in a manner exposing two lithium surfaces.

24. An anode assembly as defined in claim 19, wherein said frame member has a face portion and a continuous peripheral rim portion extending from said face portion, said lithium members being fitted within said rim portion in a manner exposing one lithium surface.

References Cited

UNITED STATES PATENTS

| | | | |
|---|---|---|---|
| 3,660,163 | 5/1972 | Moser | 136—83 R |
| 3,674,562 | 7/1972 | Schneider et al. | 136—83 R |
| 3,723,183 | 3/1973 | Greatbatch | 136—83 R |

ANTHONY SKAPARS, Primary Examiner

U.S. Cl. X.R.

136—100 R, 137